Aug. 17, 1948.  E. PICK ET AL  2,447,135
STRAINER
Filed June 20, 1946

ERIC PICK and JOSEPH J. CARLSON
INVENTORS

BY *Eric Pick*
ATTORNEY

Patented Aug. 17, 1948

2,447,135

UNITED STATES PATENT OFFICE 2,447,135

STRAINER

Eric Pick, East Rockaway, N. Y., and Joseph J. Carlson, Madison, N. J., assignors to The Permutit Company, New York, N. Y., a corporation of Delaware Application June 20, 1946, Serial No. 678,078

5 Claims. (Cl. 210—24)

1

This invention relates to strainers for liquid treating apparatus including a tank and a liquid carrying pipe inside said tank, and it comprises a strainer having a tubular member made of a resilient material of the nature of soft rubber, said pipe extending into one end of said tubular member, screw means for fastening the other end of said tubular member to said tank, a cup-shaped member fitted over said tubular member, and transverse passage means in said tubular member interconnecting the inside of said tubular member and the inside of said cup-shaped member, all as more fully described hereinafter and as claimed.

Our invention is an improvement on the type of strainer or distributor disclosed in the U. S. Patent 1,937,330 of Norman E. Brice, dated November 28, 1933.

The objects of our invention are to provide a strainer which can be fabricated with ease and convenience and at relatively low cost; which is not subject to corrosive action of liquids with which it comes in contact during use; and which obviates the need for a gasket in its installation.

The manner in which these objects are achieved is shown in the accompanying drawing in which.

Similar numerals refer to similar parts throughout the several views.

Figure 1:
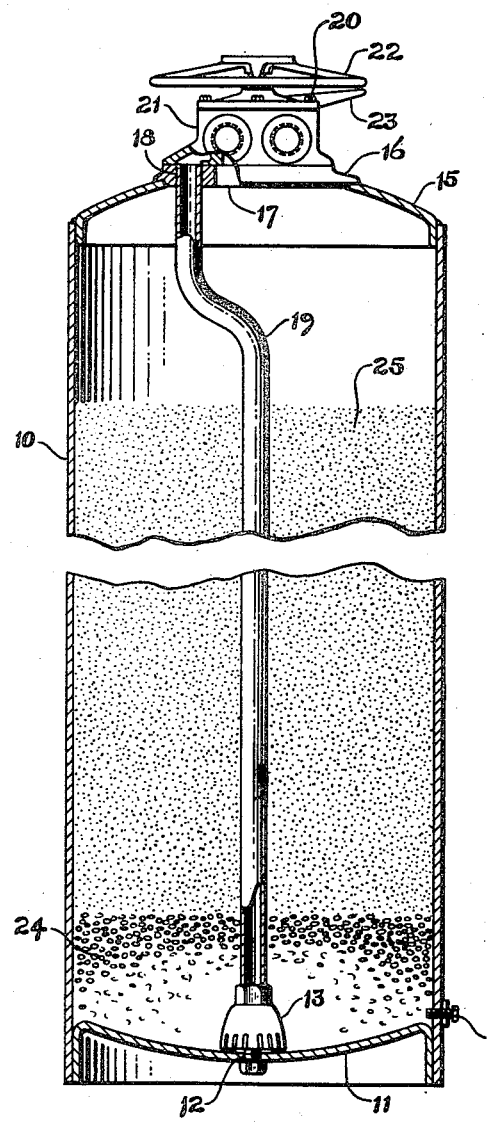
Fig. 1 is a vertical view, partly in section, of a liquid treating tank including a strainer in accordance with our invention.

Referring now to Fig. 1, the numeral 10 designates a liquid treating tank having a bottom 11 provided with a central opening 12 for attachment of our novel strainer 13. The tank is provided with a drain plug 14. The tank 10 has a top 15 with a headring 16 permanently fastened thereto, as by welding. The headring 16 is provided with an opening 17 and a smaller opening 18 to which latter is fitted, as by expanding therein, an S-shaped pipe or tube 19, extending to the strainer 13. Attached to the headring 16 by means of screws or bolts 20 is a multi-port rotary valve 21 provided with a hand-wheel 22 cooperating with a pointer 23 to indicate the operating positions. Within the tank 10 and surrounding the strainer 13 is a layer 24 of gravel or other suitable coarse material supporting the bed 25 of granular water treating material, such as zeolite when the apparatus is used for water

2 softening, sand when it is used for filtration, or activated carbon when it is used for the removal of taste and odor.

Figure 2:
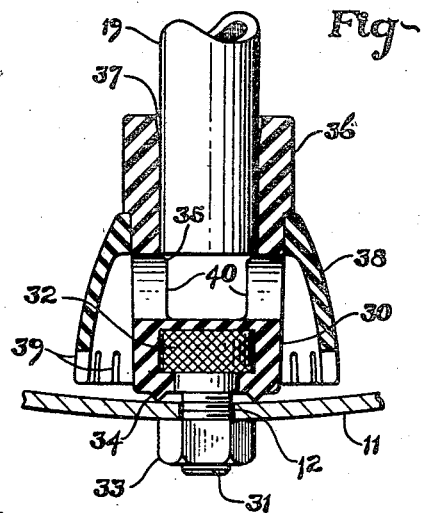
Fig. 2 is a view, on an enlarged scale and partly in section, of the strainer 13 of Fig. 1.

As shown in Fig. 2 the strainer 13 comprises a tubular member 30 advantageously made of soft rubber. A hardness of about 80 on the Shore durometer type A is satisfactory, but by no means critical. While we have found soft rubber particularly suited, the tubular member may, of course, be made of some other equivalent resilient, non-brittle material, such as neoprene, buna or other suitable plastics. A screw 31 has a knurled head 32 embedded in the lower portion of the tubular member 30. The screw 31 projects through the opening 12 in the bottom 11 of the tank 10, and by means of a nut 33, the tubular member 30 is fastened to such bottom 11. A circular ridge 34 formed on the lower face of the tubular member is pulled against the bottom of the tank when the nut 33 is tightened and thus provides a tight seal. It should be noted that for clarity of presentation the parts have been shown in a condition which they occupy when the nut 33 has not been firmly tightened. When the nut 33 is properly tightened the ridge 34 will be compressed and somewhat flattened, and the tubular member will be pulled somewhat closer to the tank bottom 11. The provision of the ridge 34 is advantageous, but not necessary since even the flat face of the tubular member, being of the nature of soft rubber, will serve to provide the required tight seal when pulled firmly against the bottom of the tank.

The tubular member is hollow with a taper at its upper end, as shown at 37, to facilitate insertion of the tube 19 which rests on a shoulder 35. The upper portion of the tubular member is enlarged into an external flange 36, advantageously of hexagon shape for the purpose of permitting a socket wrench to fit thereover to hold the tubular member 30 while the nut 33 is being tightened.

Over the outside of the tubular member 30 is fitted a cup-shaped member 38, provided with liquid distributing slots 39. Instead of such slots 39, scallops or holes may be provided for suitable straining and distribution of the liquid. The cup-shaped member 38 is advantageously made of rubber or some other suitable plastic material which is not attacked by the liquid to which it is exposed and which is sufficiently rigid so that the gravel 24 resting against it will not cause it to become distorted. If desired the cup-shaped member 38 may also be made of metal. The upper end of the cup-shaped member 38 rests against the flange 36 on the tubular member and is thus held in place when the tubular member 30 is fastened to the tank.

In the tubular member 30 are two passages 40—but any other desired number of such passages may, of course, be provided—which establish communication between the inside of the tubular member 30 and the inside of the cup-shaped member 38.

Figure 3:
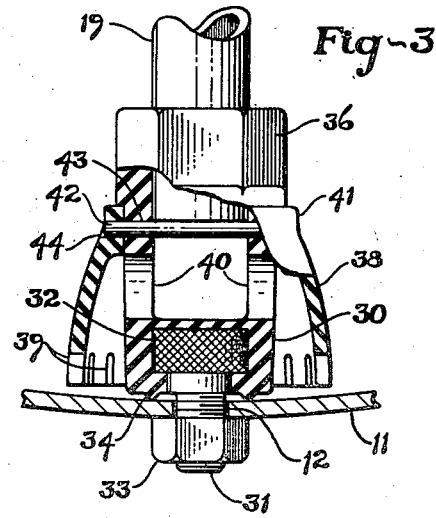
Fig. 3 is a modification of the strainer shown in Fig. 2.

In the modification shown in Fig. 3 the cup-shaped member 38 is provided at its top with an elongated cylindrical portion 41, and a pin 42 is fitted through holes 44 in such elongated portion 41 and holes 43 provided in the tubular member 30. Thus, the placing of the pin 42, made of brass, bronze, stainless steel or any other suitable material, keeps the cup-shaped member attached to the tubular member even when the strainer is removed from the tank. In this modification the lower end of the tube 19 rests against the pin 42.

In operation the flow of liquid is controlled by the multiport valve 21. For instance, the incoming liquid may be admitted through the opening 17 to flow downwardly through the bed 25 of liquid treating material and the supporting layer 24. The liquid is then collected through the slots 39 and continues through passages 40, and thence upwardly through the tube 19 and out through the valve 21.

On the other hand, the liquid may be directed by the valve 21 into the upper end of the tube 19, downwardly through the tube, thence through passages 40 to the slots 39, which distribute it uniformly, to flow upwardly through the tank 10 and out through opening 17, backwashing the bed 25 of liquid treating material.

A strainer in accordance with our invention is highly efficient and remains unaffected by water and most other liquids being treated because of the nature of the materials used in its construction. It is simple and inexpensive to make, the tubular member and the cup-shaped member being ready for use as they come from the mold, without requiring any further machine work. Being made of a relatively soft and resilient material, the tubular member, when pulled up tightly against its support, makes its own seal, thus doing away with the need for a separate gasket.

While we have shown what we consider preferred forms, modifications may be made without departing from the spirit of our invention and reference is, therefore, made to the appended claims for a definition of the scope of our invention.

What we claim is:

1. A strainer for liquid treating apparatus including a tank and a liquid carrying pipe inside said tank, comprising a hollow tubular member made of resilient soft rubber, said pipe extending into one end of said tubular member, screw means embedded in said tubular member for fastening the other end of said tubular member to said tank, a rigid cup-shaped member fitted over said tubular member, liquid straining means on said cup-shaped member, and transverse passage means in said tubular member interconnecting the inside of said tubular member and the inside of said cup-shaped member.

2. A strainer for liquid treating apparatus having a tank and a liquid carrying pipe inside said tank, comprising a hollow tubular member made of resilient soft rubber, said pipe extending into one end of said tubular member, a screw having a head embedded in the other end of said tubular member, a rigid cup-shaped member fitted over said tubular member, liquid straining means on said cup-shaped member, and transverse passage means in said tubular member interconnecting the inside of said tubular member and the inside of said cup-shaped member.

3. A strainer for liquid treating apparatus having a tank and a liquid carrying pipe inside said tank, comprising a hollow tubular member made of resilient soft rubber, an external flange adjacent to one end of said tubular member, said pipe extending into said one end of said tubular member, screw means embedded in said tubular member for fastening the other end of said tubular member to said tank, a rigid cup-shaped member fitted over said tubular member and abutting said flange, liquid straining means on said cup-shaped member, and transverse passage means in said tubular member interconnecting the inside of said tubular member and the inside of said cup-shaped member.

4. A strainer for liquid treating apparatus having a tank and a liquid carrying pipe inside said tank, comprising a hollow tubular member made of resilient soft rubber, said pipe extending into one end of said tubular member, screw means imbedded in said tubular member for fastening the other end of said tubular member to said tank, a rigid cup-shaped member fitted over said tubular member, liquid straining means on said cup-shaped member, a pin fastening said cup-shaped member to said tubular member, and transverse passage means in said tubular member interconnecting the inside of said tubular member and the inside of said cup-shaped member.

5. A strainer for liquid treating apparatus having a tank and a liquid carrying pipe inside said tank, comprising a tubular member made of resilient soft rubber, said pipe extending into one end of said tubular member, screw means imbedded in said tubular member for fastening the other end of said tubular member to said tank, a circular ridge projecting from said other end of said tubular member, a rigid cup-shaped member fitted over said tubular member, liquid straining means on said cup-shaped member, and transverse passage means in said tubular member interconnecting the inside of said tubular member and the inside of said cup-shaped member.

ERIC PICK.
JOSEPH J. CARLSON.

REFERENCES CITED

The following references are of record in the file of this patent:

UNITED STATES PATENTS

| Number | Name | Date |
|---|---|---|
| 571,278 | McCawley | Nov. 10, 1896 |
| 598,250 | Jackson | Feb. 1, 1898 |
| 1,937,330 | Brice | Nov. 28, 1933 |
| 2,293,928 | Beal | Aug. 25, 1942 |
| 2,371,895 | Kingman | Mar. 20, 1945 |